Jan. 22, 1946.  C. E. KERR  2,393,382
MULTIPLE LIQUID MEASURING AND MIXING CAN FILLER
Filed May 22, 1942  2 Sheets-Sheet 1
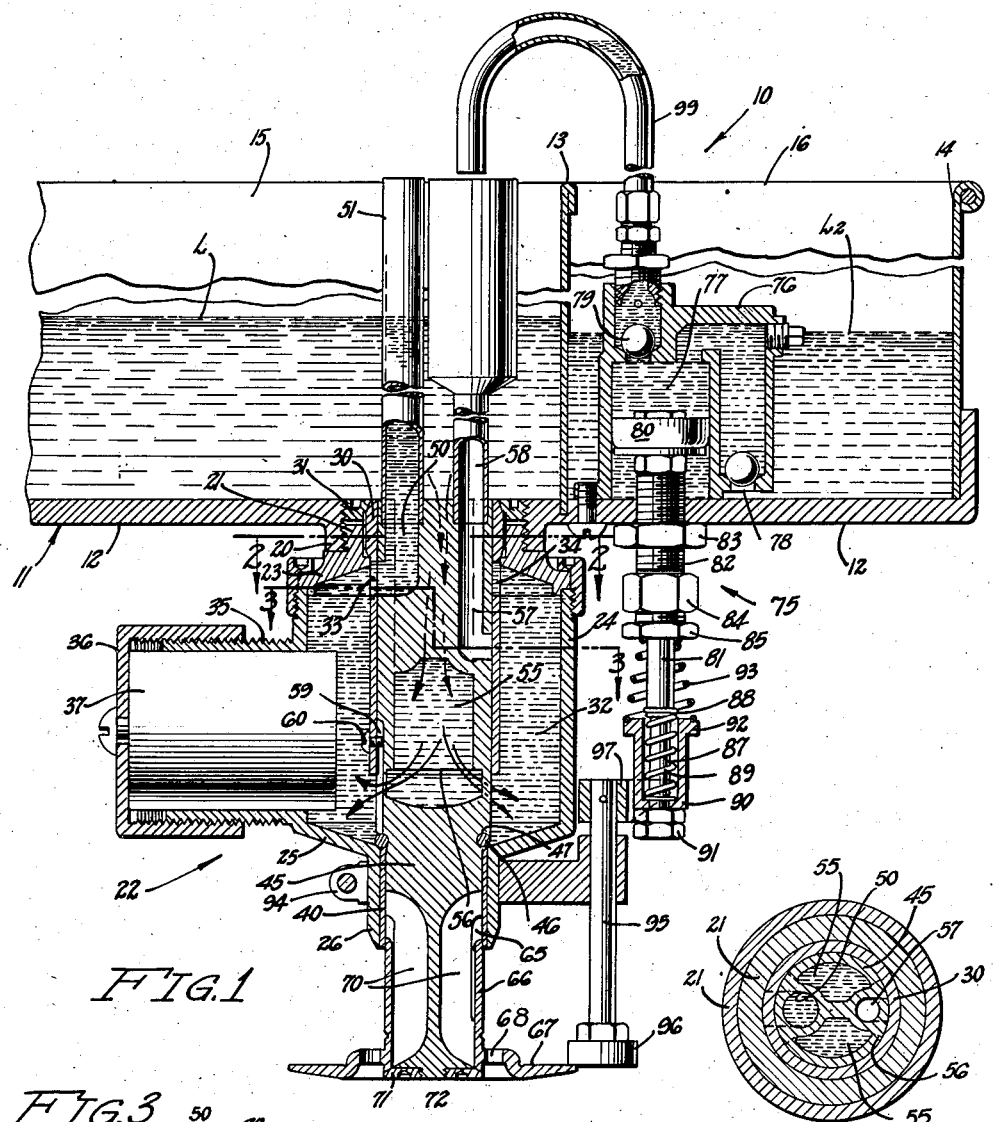
FIG.1
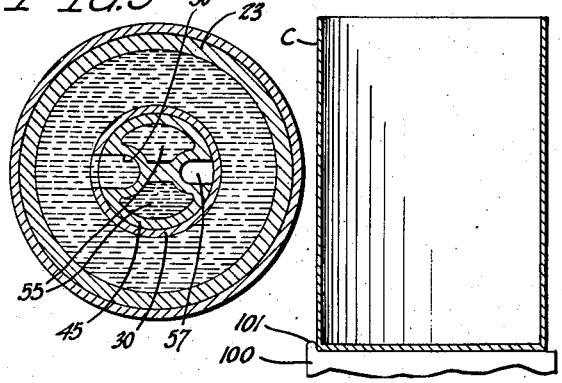
FIG.3
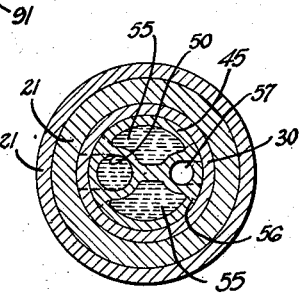
FIG.2
INVENTOR:
CHARLES E. KERR
BY
ATTORNEY Jan. 22, 1946.  C. E. KERR  2,393,382
MULTIPLE LIQUID MEASURING AND MIXING CAN FILLER
Filed May 22, 1942  2 Sheets-Sheet 2

INVENTOR:
CHARLES E. KERR
BY
ATTORNEY

Patented Jan. 22, 1946

2,393,382

UNITED STATES PATENT OFFICE 2,393,382

MULTIPLE LIQUID MEASURING AND MIXING CAN FILLER

Charles E. Kerr, Hoopeston, Ill., assignor to Food Machinery Corporation, San Jose, Calif., a corporation of Delaware Application May 22, 1942, Serial No. 444,063

12 Claims. (Cl. 226—108)

This invention relates to can filling machines and it is a primary object of the invention to provide such a machine which delivers separately measured quantities of a plurality of liquids to a can.

It is a further object of the invention to provide a mechanism adapted to be incorporated with a can filling machine such as in use heretofore for filling cans with a single liquid, said device being operated automatically by the normal operation of the aforesaid machine to deliver to each can filled by the machine a measured quantity of a second liquid.

The manner of accomplishing the foregoing objects, as well as further objects and advantages, will be made manifest in the following description taken in connection with the accompanying drawings in which:

Fig. 1 is a vertical sectional view of the invention in readiness to commence a can filling operation.

Fig. 2 is a horizontal sectional view taken on the line 2—2 of Fig. 1.

Fig. 3 is a horizontal sectional view taken on the line 3—3 of Fig. 1.

Figure 4:
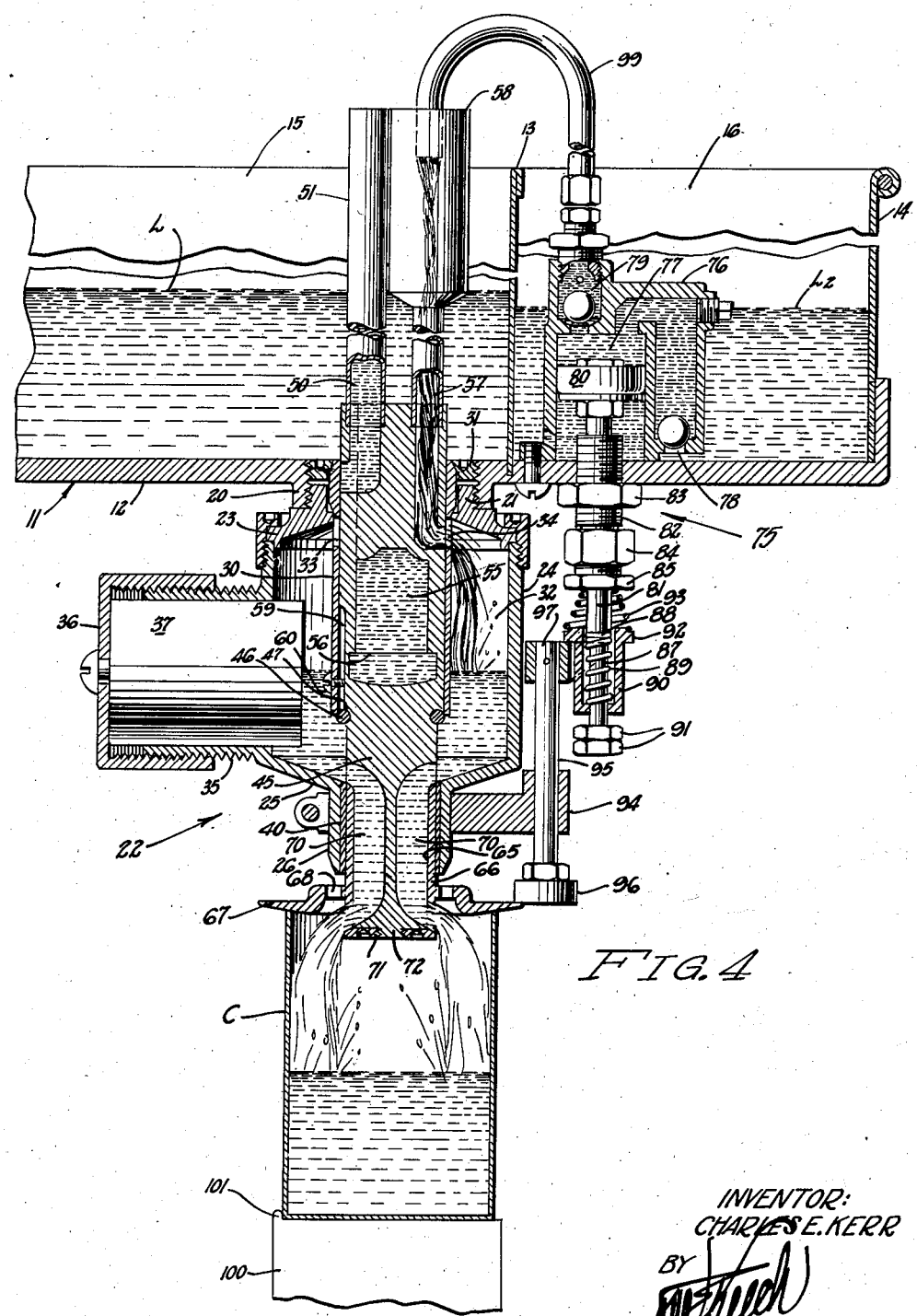
Fig. 4 is a view similar to Fig. 1 and illustrates said machine in the middle of a can filling operation.

Referring specifically to the drawings, a preferred embodiment of the invention shown therein comprises a filling machine 10, only a portion of which is shown, the construction of the balance of the machine being well known in the can filling art. The machine 10 includes a frame 11 embodying a reservoir bottom or base 12 on which are mounted concentric annular walls 13 and 14 which cooperate with the reservoir base 12 to form liquid tanks or reservoirs 15 and 16. Screwed upwardly into an apertured and internally threaded boss 20 on the base 12 is a threaded neck 21 of a liquid measuring and dispensing unit 22. The neck 21 is formed on the cap 23 of a shell 24 having a bottom 25 which is centrally apertured and provided with a downwardly extending cylindrical neck 26.

The neck 21 has a sleeve 30 securely mounted therein and held in place by a ring nut 31 so as to extend downwardly into the measuring chamber 32 provided within the unit 22. Provided in the sleeve 30 are ports 33 and 34.

The shell 24 has an externally threaded hollow boss 35 extending laterally therefrom. Screwed onto this boss is a cap 36 the latter carrying a plug 37 which extends inwardly through the boss 35 to adjustably determine the cubical content of the chamber 32.

Provided in the lower neck 26 of the shell 24 is a wear sleeve 40 and vertically slideable in the sleeves 30 and 40 is a cylindrical valve 45 which is in its lowermost position when a ring 46 contracted thereabout in a recess 47 formed in the valve rests against the upper end of the sleeve 40, as shown in Fig. 1, and is in its uppermost position when this ring engages the lower end of the sleeve 30, as shown in Fig. 4.

Formed in the valve 45 is a riser passage 50, in the upper end of which a riser 51 is mounted, and the lower end of which connects with the port 33 when the valve 45 is in downwardmost position. Also formed in the valve 45 are inlet passages 55 which unite at their lower ends and there have mouths 56 through which they communicate with the chamber 32 when the valve 45 is in its lowermost position. Thus when the valve 45 is in downward position liquid from the reservoir 15 is free to flow downwardly through the inlet passages 55 into the chamber 32, the air from the latter escaping upwardly through the riser passage 50 and the riser 51 until the liquid in the chamber 32 and riser 51 reaches the same level as the liquid in the reservoir 15.

Also provided in an upper portion of the valve 45 in the same transverse plane as the riser passage 50 is a secondary liquid intake passage 57, a funnel 58 being fitted into the upper end of this passage. The lower end of passage 57 communicates with the sleeve port 34, when the valve 45 is in its uppermost position. To prevent the rotation of the valve 45 in its unit 22, this valve is provided with a slot 59 into which a screw 60, provided in the sleeve 30, extends.

The lower end of the valve 45 is turned down to provide an annular recess 65 which slideably receives a cut-off valve sleeve 66. This sleeve has an annular can contacting flange 67 extending outwardly from its lower end, this flange having air vents 68.

Also formed in the lower end of the valve 45 are drain passages 70, the lower ends of which are closed when the sleeve 66 is allowed to descend by gravity into contact with a drain valve disc 71 which is threadedly received on a boss 72 formed on the lower end of the valve 45.

Mounted adjacent each primary liquid measuring and dispensing unit 22 is a secondary liquid measuring and dispensing unit 75. This unit includes a pump housing 76 which is mounted on the reservoir base 12 within the reservoir 16 and has a cylindrical pump chamber 77 which connects with an inlet valve 78 and an exhaust valve 79. Slideably received in the chamber 77 is a piston 80 which is mounted on the upper end of a piston rod 81, the latter being slideable in a threaded sleeve 82 which screws upwardly through a threaded hole in the reservoir base 12, and is held therein at an adjusted elevation by a lock nut 83. The lower end of the sleeve 82 has a hexagonal head 84 in which a stuffing box is formed by a gland 85 to prevent leakage of liquid downwardly between the sleeve 82 and the piston rod 81. The lower portion 87 of the piston rod 81 is of a reduced diameter. At the upper end of the portion 87 is a washer 88 which is held there by a coiled spring 89 and a cap 90 which is trapped on the rod section 87 by lock nuts 91 screwed onto the end thereof. The upper end of the cap 90 has a flange 92 and the rod 81 is held in its lowermost position with the piston 80 against the upper end of the sleeve 82 by a coiled expansion spring 93 compressed between the gland 85 and the flange 92.

Gripping the lower neck 26 of the unit 22 is a clamp 94 which slideably guides a push rod 95 having a foot 96 at its lower end, which overlaps the flange 67, and a forked head 97 at its upper end which straddles the cap 90 so that when the rod 95 is lifted the head 97 comes in contact with the flange 92 and lifts this, thereby compressing the spring 89 against the washer 88 so that the expansive power of this spring is applied toward lifting the piston 80 and expelling liquid from the chamber 77 upwardly through the discharge valve 79. This valve connects with a pipe 99 which is curved to point downwardly over the funnel 58 so that liquid pumped upwardly through the valve 79 is delivered by the pipe 99 into the funnel 58, as shown in Fig. 4.

The can filling machine 10 also includes an elevator 100 on which cans C are placed, the elevator having guide flanges 101 which centralize each of the cans C resting thereon with one of the liquid measuring and dispensing units 22, with the upper end of this can disposed just below the flange 67, as shown in Fig. 1.

*Operation*

Operation of the machine 10 to fill cans C placed on the elevator 100 is effected by a mechanism (not shown) which vertically reciprocates the elevator 100 and which functions each time the latter reaches its downward position to remove the filled cans from the elevator and to supply empty cans to the elevator to take the place of those thus removed.

Before starting to operate the machine the position of the plug 37 is adjusted by rotation of the cap 36 so that the chamber 32 is of a cubical capacity to measure, when completely filled, the exact amount of liquid L from the reservoir 15 which it is desired to place in each can C. The initial position of the plunger 80 is also adjustably determined by loosening the lock nut 83 and rotating the threaded sleeve 82 so that the amount of liquid displaced by movement of the plunger 80 between its lower position in which it is shown in Fig. 1 and its uppermost position will be the amount of liquid L—2 which it is desired to feed from the reservoir 16 into each can C.

At the beginning of each reciprocation of the elevator 100 it is in lowermost position, as shown in Fig. 1, with an empty can C disposed thereon in vertical alignment with each of the units 22. As the elevator rises the upper end of this can is brought into contact with the flange 67 which lifts the valve sleeve 66. This results in opening the lower ends of the passages 70 and, when the upper end of the valve sleeve 66 reaches the upper end of the recess 65, causes further upward movement of the can C to lift the valve 45. The position of the can C and valve 45, when the elevator 100 reaches its uppermost position, is shown in Fig. 4. Here it is seen that the lifting of the valve 45 has brought upper ends of the passages 70 in communication with the lower end of the chamber 32 so that the liquid L contained therein drains downwardly through these passages into the can C.

It is also to be noted from Fig. 4 that the initial upward movement of the valve 45 shifts the riser passage 50 out of registry with the port 33 so as to close the latter and prevent liquid L in the riser passage and the riser 51 from draining into the chamber 32. Arrival of the valve 45 in its upper position also brings the lower end of the passage 57 into communication with the port 34.

Overlying the flange 67 as it does, the foot 96 is lifted by the elevation of this flange to an upward position in which it is shown in Fig. 4. This shifts the head 97 into contact with the flange 92 so as to lift the cap 90 and compress the spring 89 as well as the spring 93. The pressure of the spring 89 is thus applied to the piston rod 81 and moves the piston 80 upwardly forcing a measured amount of liquid L—2 out of the chamber 77, through the valve 79 and into the pipe 99. A level of liquid L—2 being normally maintained up to the bend in the pipe 99, an equal measured amount of liquid L—2 is thus caused to flow over the bend in the pipe 99 and downwardly from this pipe into the funnel 58. As this funnel communicates directly through the passage 57 and port 34 with the chamber 32, this measured amount of liquid L—2 flows directly into this chamber, mixes therein with the measured amount of liquid L at that moment draining into the can C, and flows with this liquid L into this can.

The transmission of the upward movement of the elevator 100 to the piston 80 through the spring 89 permits the elevator to rise rapidly to give the maximum time for the drainage of the liquid L in the chamber 32 into the can C, without too rapidly operating the piston 80. The movement of the piston 80 is thus slow enough so as to eliminate splashing of the liquid L—2 in the funnel 58 and so as to provide relatively accurate measurement of the amount of liquid L—2 delivered by the unit 75 during each cycle of operation.

Despite the unit 75 being thus retarded in its discharge of liquid L—2 into the funnel 58, the action of this unit is completed and the liquid discharged thereby substantially completely drains downwardly through the passage 57 into the chamber 32 and mixes with liquid L which is draining from this chamber before the level of the latter descends to the upper ends of the passages 70. In the operation of the machine the elevator 100 remains in upward position until all the liquid L and the liquid L—2 mixed therewith in the chamber 32 flows downwardly through the passages 70 and into the can C; that is, all of such liquid except that which merely adheres by virtue of its viscosity to the surfaces of the chamber 32 and the passages 70.

The machine 10 is so adjusted that when the discharge of liquid into the can C has taken place, exactly the desired measured amounts of liquid L and liquid L—2 have been placed in this can by this operation. The elevator is so timed that at this moment it starts downwardly returning to its lowermost position in which it is shown in Fig. 1 and the can C thus properly filled with the mixture of liquids L and L—2 is removed from the table and replaced by an empty can by the mechanism above mentioned as being provided therefor.

From the foregoing description it will be seen that I have provided a can filling machine by which cans may be commercially filled with a mixture of two liquids separately measured and dispensed at the time of filling each can. It is also to be noted that the unit 75 is adapted to be added to can filling machines of a type hitherto in common use with only minor modifications in the old apparatus such as the addition of the wall 13, port 34, passage 57 and funnel 58.

I claim:

1. In a device for dispensing liquid by a gravity flow of said liquid from a tank into a container, the combination of: means forming a measuring chamber; valve means including a valve member slideably passing entirely through said measuring chamber, said valve means having separate ports for controlling the passage of liquid and air into and from said chamber and controlling the flow of liquid from said chamber into said container in response to reciprocation of said valve member; and means for admitting into said container with said liquid a secondary material by delivering said material into said chamber through a port for admitting air into said chamber while liquid is flowing from said chamber into said container.

2. In a device for dispensing liquid by a gravity flow of said liquid from a tank into a container in response to engagement with the container, the combination of: means forming a measuring chamber; valve means including a valve member slideably passing entirely through said measuring chamber, said valve means having separate ports for controlling the passage of liquid and air into and from said chamber and controlling the flow of liquid from said chamber into said container in response to reciprocation of said valve member by said container, one of said ports providing for admitting air into said measuring chamber during the emptying of said chamber; and means for delivering a secondary material into the container by feeding said material into said chamber through said air port.

3. In a device for dispensing liquid by a gravity flow of said liquid from a tank into a container, the combination of: means forming a measuring chamber; valve means including a valve member slideably passing entirely through said measuring chamber, said valve means having separate ports for controlling the passage of liquid and air into and from said chamber and controlling the flow of liquid from said chamber into said container in response to reciprocation of said valve member, one of said ports providing for admitting air downwardly from the atmosphere above said liquid in said tank into said measuring chamber during the emptying of said chamber; and means for delivering a secondary material into the container by feeding said material into said chamber through said air port.

4. In a device for dispensing liquid by a gravity flow of said liquid from a tank into a container, the combination of: means forming a measuring chamber; valve means including a valve member slideably passing entirely through said measuring chamber said valve means having separate ports for controlling the passage of liquid and air into and from said chamber and controlling the flow of liquid from said chamber into said container in response to reciprocation of said valve member, one of said ports providing for admitting air into said measuring chamber during the emptying of said chamber; and means responsive to the actuation of said valve member for delivering a secondary material into the container by feeding said material into said chamber through said air port.

5. In a device for dispensing liquid into containers, the combination of: means forming primary and secondary tanks having a common bottom and adapted to contain primary and secondary liquids respectively; means mounted on said bottom beneath said primary tank to form a measuring chamber; valve means including a valve member slideably passing entirely through said measuring chamber, said valve means having separate ports for controlling the passage of liquid and air into and from said chamber in response to vertical reciprocation of said valve member in said chamber, one of said ports providing for admitting air into said measuring chamber while liquid is flowing from the latter, said valve member, when in a lower position, admitting primary liquid from said primary tank to exactly fill said chamber and functioning when lifted into its upward position to shut off the flow of liquid downwardly into said chamber and discharge the exactly measured quantity of liquid in said chamber downwardly into a container disposed therebelow; conduit means extending upwardly from said air port through said primary liquid in said primary tank to connect said air port with the atmosphere; pump means mounted on said bottom and disposed to receive secondary liquid from said secondary tank and discharge said liquid into said conduit means; and means for actuating said pump in timed relation with the upward movement of said valve member to pump a measured quantity of secondary liquid into said conduit means so that said secondary liquid so pumped flows downwardly through said air port into said chamber, mixes with primary liquid therein, and flows with said primary liquid into the container disposed therebelow.

6. In a device for dispensing liquid by a gravity flow of said liquid from a tank into a container, the combination of: a tank for containing said liquid; means mounted on the bottom of said tank and forming a measuring chamber; valve means including a valve member slideably passing entirely through said measuring chamber, said valve means having separate ports for controlling the passage of liquid and air into and from said chamber in response to vertical reciprocation of said valve member, one of said ports providing for admitting air into said measuring chamber during the emptying of said chamber; conduit means provided on said valve member connecting with said air port and extending upwardly through the liquid in said tank to communicate with the atmosphere; and a funnel provided on said conduit means for receiving supplementary material and delivering this through said conduit means and said air port into said measuring chamber when said air port is open during the positioning of said valve member to cause a downward flow of liquid from said chamber into a container disposed therebelow.

7. In a device for dispensing liquid by a gravity flow of said liquid from a tank into a container, the combination of: a tank for containing said liquid; means mounted on the bottom of said tank and forming a measuring chamber; valve means including a valve member slideably passing entirely through said measuring chamber, said valve means having separate ports for controlling the passage of liquid and air into and from said chamber in response to vertical reciprocation of said valve member, one of said ports providing for admitting air into said measuring chamber; and means for admitting air and supplemental material into said chamber through said air port while said valve member is positioned to cause the discharge of a measured quantity of said liquid from said chamber downwardly into a container disposed therebelow so that said supplementary material is discharged with said liquid into said container.

8. In combination: a liquid tank; a shell forming a measuring chamber opening upwardly into said tank to receive liquid therefrom and downwardly to deliver said liquid to a container; and valve means including a plunger reciprocable in said chamber between upward and downward positions to control delivery of liquid from said tank into said chamber and from said chamber into said container, said valve means including chamber liquid filling means communicating between said tank and said chamber when said plunger is downward but closed when said plunger is upward, chamber liquid emptying means closed when said plunger is downward but opening downwardly from said chamber when said plunger is upward, chamber air emptying means opening upwardly to the atmosphere from the upper end of said chamber when said plunger is downward but closed when said plunger is upward, and chamber air filling means which is closed when said plunger is downward but which opens from said chamber upwardly to the atmosphere when said plunger is upward.

9. In combination: a liquid tank; a shell forming a measuring chamber opening upwardly into said tank to receive liquid therefrom and downwardly to deliver said liquid to a container; valve means including a plunger reciprocable in said chamber between upward and downward positions to control delivery of liquid from said tank into said chamber and from said chamber into said container, said valve means including chamber liquid filling means communicating between said tank and said chamber when said plunger is downward but closed when said plunger is upward, chamber liquid emptying means closed when said plunger is downward but opening downwardly from said chamber when said plunger is upward, chamber air emptying means opening upwardly to the atmosphere from the upper end of said chamber when said plunger is downward but closed when said plunger is upward, and chamber air filling means which is closed when said plunger is downward but which opens upwardly from said chamber to the atmosphere when said plunger is upward; and means operating coordinately with said plunger to deliver a predetermined quantity of a liquid material through said chamber air filling means and into said chamber when said plunger is disposed upward so that said material flows with the liquid in said chamber through said chamber liquid emptying means and into said container.

10. In combination: a liquid tank; a shell forming a measuring chamber opening upwardly into said tank to receive liquid therefrom and downwardly to deliver said liquid to a container; and valve means including a plunger which extends downwardly and upwardly through said shell and upwardly through the liquid in said tank to a point above the upper level thereof, said plunger being reciprocable between upward and downward positions to control delivery of liquid from said tank into said chamber and from said chamber into said container, said valve means including chamber liquid filling means having a passage in said plunger which communicates between said tank and said chamber when said plunger is downward but which is closed when said plunger is upward, chamber liquid emptying means having a plunger passage which is closed when said plunger is downward but which opens downwardly from said chamber when said plunger is upward, chamber air emptying means having a plunger passage which opens upwardly to the atmosphere from the upper end of said chamber when said plunger is downward but which is closed when said plunger is upward, and chamber air filling means having a plunger passage which is closed when said plunger is downward but which opens from said chamber upwardly to the atmosphere when said plunger is upward.

11. In combination: a liquid tank; a shell forming a measuring chamber opening upwardly into said tank to receive liquid therefrom and downwardly to deliver said liquid to a container; valve means including a plunger which extends downwardly and upwardly through said shell and upwardly through the liquid in said tank to a point above the upper level thereof, said plunger being reciprocable between upward and downward positions to control delivery of liquid from said tank into said chamber and from said chamber into said container, said valve means including chamber liquid filling means having a passage in said plunger which communicates between said tank and said chamber when said plunger is downward but which is closed when said plunger is upward, chamber liquid emptying means having a plunger passage which is closed when said plunger is downward but which opens downwardly from said chamber when said plunger is upward, chamber air emptying means having a plunger passage which opens upwardly to the atmosphere from the upper end of said chamber when said plunger is downward but which is closed when said plunger is upward, and chamber air filling means having a plunger passage which is closed when said plunger is downward but which opens from said chamber upwardly to the atmosphere when said plunger is upward; and means operating coordinately with said plunger to deliver a predetermined quantity of a liquid material into said plunger passage of said chamber air filling means whereby said material flows from said passage into said chamber when said plunger is disposed upward so that said material gravitates with the liquid in said chamber through said chamber liquid emptying means and into said container.

12. In a container filler the combination of: liquid supply means; means forming a liquid measuring chamber, and providing a liquid filling port therefor, a liquid emptying port therefor, an air and liquid outlet port therefor and an air inlet port therefor, said air ports communicating with the upper portion of said chamber, means providing separate passages extending upwardly from said air ports, and a unitary valve means operative in one phase to shut said emptying port, open said filling port to admit liquid from said supply means to said chamber, open said air outlet port and shut said air inlet port, said valve means being operative in another phase to open said emptying port, shut said filling port, shut said air and liquid outlet port, and open said air inlet port; means for delivering a measured quantity of a secondary liquid to said air inlet port passage; and means for presenting a container to receive liquid discharged through said chamber emptying port, actuate said valve means in the second phase aforesaid, actuate said secondary liquid means to function as aforesaid, and then actuate said valve means in the first phase aforesaid to restore said filler for another container filling operation.

CHARLES E. KERR.